US009361192B2

(12) United States Patent  
Smith et al.

(10) Patent No.: US 9,361,192 B2
(45) Date of Patent: Jun. 7, 2016

(54) METHOD AND APPARATUS FOR RESTORING AN INSTANCE OF A STORAGE SERVER

(71) Applicant: Oracle International Corporation, Redwood City, CA (US)

(72) Inventors: Jeffrey Anderson Smith, Hutto, TX (US); Piyush Shivam, Austin, TX (US); William Eugene Baker, Austin, TX (US)

(73) Assignee: Oracle International Corporation, Redwood City, CA (US)

(*) Notice: Subject to any disclaimer, the term of this patent is extended or adjusted under 35 U.S.C. 154(b) by 694 days.

(21) Appl. No.: 13/656,060

(22) Filed: Oct. 19, 2012

(65) Prior Publication Data

US 2014/0115310 A1    Apr. 24, 2014

(51) Int. Cl.
G06F 9/00 (2006.01)
G06F 15/177 (2006.01)
G06F 11/20 (2006.01)
H04L 12/931 (2013.01)
H04L 12/24 (2006.01)
H04L 12/703 (2013.01)
G06F 3/06 (2006.01)
G06F 11/14 (2006.01)
G06F 9/44 (2006.01)

(52) U.S. Cl.
CPC .............. *G06F 11/2033* (2013.01); *G06F 3/06* (2013.01); *G06F 11/1441* (2013.01); *H04L 41/06* (2013.01); *H04L 45/28* (2013.01); *H04L 49/65* (2013.01); *G06F 9/4401* (2013.01)

(58) Field of Classification Search
CPC ... G06F 9/44; G06F 11/2033; G06F 11/1441; G06F 3/06; G06F 9/4401; H04L 41/06; H04L 45/28; H04L 49/65; H04L 69/40; H04L 43/0829

See application file for complete search history.

(56) References Cited

U.S. PATENT DOCUMENTS

| | | | | |
|---|---|---|---|---|
| 7,739,403 | B1* | 6/2010 | Balakrishna | H04L 12/66 709/225 |
| 7,804,769 | B1* | 9/2010 | Tuplur | H04L 45/00 370/218 |
| 2008/0028402 | A1* | 1/2008 | Senoo | G06F 9/4856 718/1 |
| 2008/0291906 | A1* | 11/2008 | Chigurupati et al. | 370/356 |
| 2009/0157882 | A1* | 6/2009 | Kashyap | H04L 69/16 709/227 |
| 2010/0005097 | A1* | 1/2010 | Liang et al. | 707/8 |
| 2011/0265084 | A1* | 10/2011 | Knowles | G06F 9/461 718/1 |
| 2012/0254342 | A1* | 10/2012 | Evans | 709/214 |
| 2013/0031342 | A1* | 1/2013 | French | G06F 9/4418 713/2 |

\* cited by examiner

*Primary Examiner* — Thomas Lee
*Assistant Examiner* — Zhipeng Wang
(74) *Attorney, Agent, or Firm* — Polsinelli PC (57) ABSTRACT

Implementations of the present disclosure involve a system and/or method for gracelessly rebooting a storage appliance. The method and system includes a storage appliance in association with an event that will result in the loss of a state table from volatile memory that halts changes to at least one state table of the storage appliance. The state tables describe a plurality of file system states of one or more clients connected to the first storage appliance. The state information is written to a persistent memory of the storage appliance. The state table may then be repopulated using the state table information stored in persistent memory.

14 Claims, 7 Drawing Sheets

METHOD AND APPARATUS FOR RESTORING AN INSTANCE OF A STORAGE SERVER

TECHNICAL FIELD

Aspects of the present disclosure relate to network file systems utilizing storage appliances. More particularly, aspects of the present disclosure involve an apparatus and method for restoring an instance of a storage server by harvesting the state tables on the harvest or storage server, storing the tables in a persistent memory, and restoring the instance using the state tables.

BACKGROUND

As the number of computing devices increase across society, electronic data management has become increasingly challenging. Modern devices create and use ever increasing amounts of electronic data ranging from digital photos and videos, to large data sets related to any number of topics including energy exploration, human resources, seismic activity, and gene research. This explosion in digital data has naturally led to ever increasingly large amounts of data that must be stored. Correspondingly, the data storage field is under constant pressure to increase size, performance, accessibility, reliability, security, and efficiency of data storage systems.

In order to meet this demand for data storage, various storage systems have been developed. Large scale storage systems often include storage appliances that include arrays of hard drives and other forms of memory and storage. Multiple storage appliances may be networked together to form a cluster. A cluster of storage appliances allows for adding capacity as well as adding redundancy. Storage appliances in a cluster may be configured to mirror data so that if one of the storage appliances becomes inoperable for any reason, the data is still available at another location.

Figure 1:
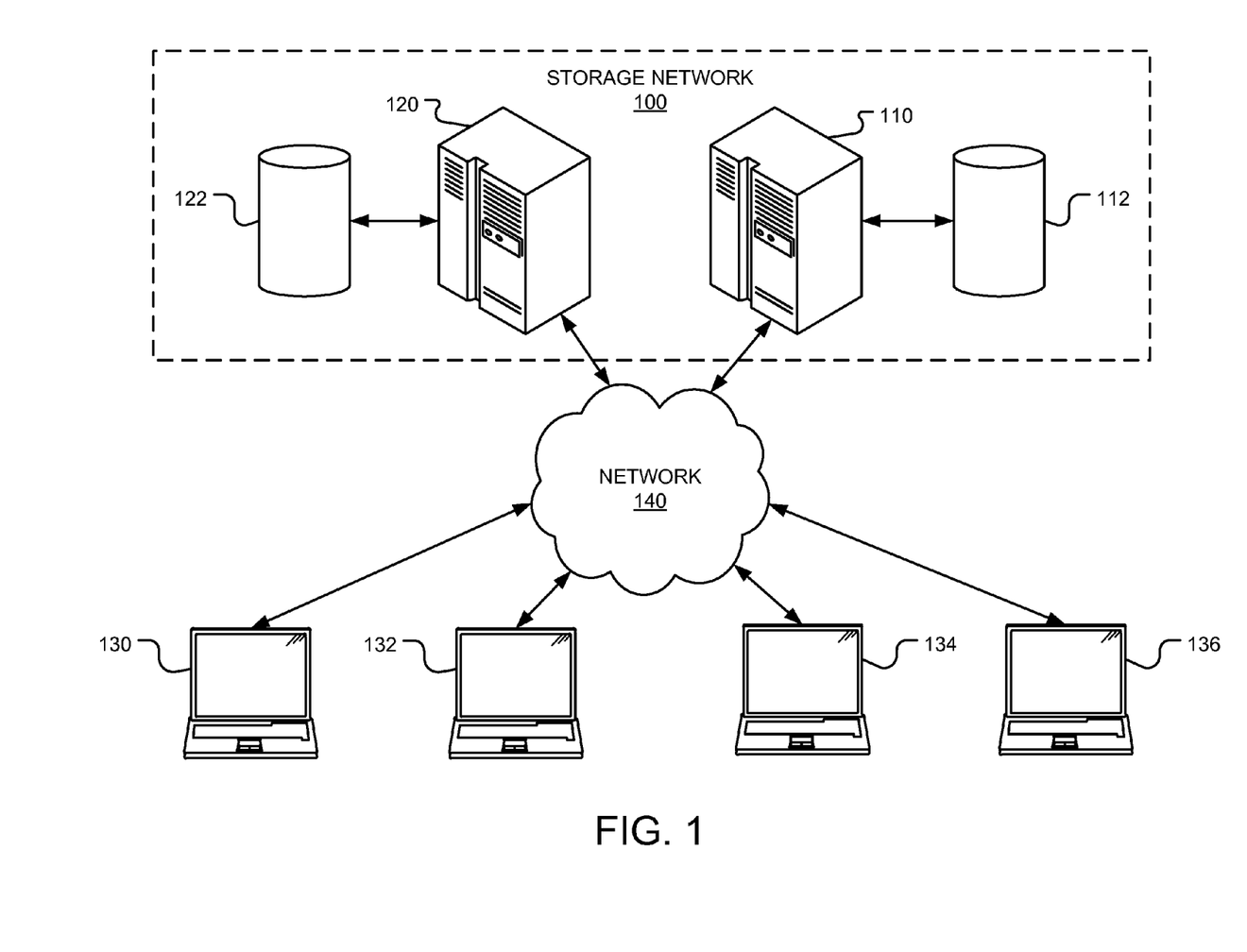
FIG. 1 is a block diagram illustrating an example of a data storage system.

Referring to FIG. 1, a storage network 100 is depicted. This storage network 100 includes one or more storage appliances 110, 120 each including one or more disk drives 112, 122. The storage network 100 is accessible by clients 130, 132, 134, 136 using a network 140. Generally speaking, the storage appliance (or appliances) manages the storage of data on the disk drives 112, 122. The depicted networks may be local in nature or geographically dispersed such as with large private enterprise networks or the Internet.

The storage appliances 110, 120 may include any conventional storage appliances such as ZFS storage appliances. ZFS is a combined file system and volume manager designed by Sun Microsystems® in 2005 that allows for data integrity verification and repair, high storage capacities, along with numerous other features. ZFS based systems utilize storage pools constructed of virtual devices (often referred to as vdevs) constructed of block devices, in this case the disk drives 112, 122. A block device is any device that moves data in the form of blocks. This includes hard disk drives, flash drives, and other addressable regions of memory. A virtual device may span a number of block devices and a pool may include one or more vdevs, each including one or more partitions of hard drives or one or more hard drives.

Traffic to and from the storage appliances 110, 120 is typically managed by the one or more dedicated storage servers located within the appliances. A common protocol employed on the storage appliances 110, 120 for accessing files, directories, and their associated metadata is the network file system, commonly abbreviated "NFS." NFS is a widely used distributed file system protocol, originally developed by Sun Microsystems in 1984, and currently in version 4 (NFSv4). NFS allows users at the clients 130-136 to access the stored data seamlessly by providing a programming interface that enables the creation and deletion of files, reading and writing of files, performing seeks within a file, creating and deleting directories, managing directory contents, and other file operations. The operating system running on each of the clients 130-136 is configured to utilize the programming interface in order to manage the file system and manage the interaction between executing applications with data residing in the storage appliances 110, 120.

In this example, the storage appliances 110, 120 are configured to operate using NFSv4. Generally, NFS systems are configured to manage file-system metadata and provide access to files and directories. The metadata describes the location of the files on the storage appliances' disk drives 112, 122 that the clients 130-136 are attempting to access. NFS is a "statefull" protocol meaning the storage appliances 110, 120 each maintain a log of current operations being performed by the clients 130-136. This log is often referred to as "state table."

Each storage appliance 110, 120 is aware of the pools that are being served by each storage appliance 110, 120. Each pool has a corresponding distributed stable storage (DSS) path where the storage server writes persistent data about each client 130-136 when the client first contacts the server. This data may be used to identify data owned by a client if the client becomes disconnected from the storage server or storage appliances 110, 120.

Users witness the statefulness of the system when a storage appliance 110, 120 reboots or undergoes a takeover, a failover, or a failback. A reboot, for example, involves the storage appliance's entire system shutting down using an orderly shutdown procedure. During the shutdown, all of the processes running on the storage appliance 110, 120 are discontinued. After the shutdown is complete, the appliance may or may not be power cycled, all necessary processes and applications may be restarted, and normal operation may be restarted.

A failover or takeover involves two or more storage appliances configured in a cluster. Each of the storage appliances 110, 120, often referred to as "nodes," export different resources, pools and interfaces to the clients 130-136. During a failover or takeover, one of the storage appliances transfers its responsibilities for managing its various resources, pools, and interfaces to the other storage appliance and DNS paths are also copied over to the other storage appliance. A failover or takeover is generally triggered when one of the nodes reboots or panics. A failback is the opposite of a failover/takeover. When a failback occurs, a node has been brought back online and the pools and interfaces that were taken over by the peer node are transferred back to the node that originally was in charge of them. The ability to perform failovers/takeovers and failbacks is a feature of having multiple storage appliances 110, 120 arranged in a cluster, increasing the uptime of a system.

When a reboot, failover, takeover, or failback occurs, whatever action that was being performed on a storage appliance 110, 120 is stopped until the reboot, failover, takeover, failback or other event completes. Once the event completes, the last state of each client must be resent to the system by each client 130-136 to re-teach the system what it was doing before the event. If this state is not sent to the system, the system won't know what to do with the client. For example, if the client was downloading data and that download did not complete, the download wouldn't automatically restart. In order to facilitate the re-teaching of the system, a grace period is initiated to allow the clients 130-136 to resend their state data. During the grace period, the system prohibits any new requests for data to be made. To a client 130-136, the grace period causes whatever action the client was performing to stall or become non-responsive until the states have been restored and the grace period ends. The duration of the grace period is defined by the server with the most common value used for the grace period being 90 seconds. In a typically distributed storage system, typical events such as reboots, failovers, takeovers, and failbacks cause noticeable delays and disruptions to performance while the system goes through the grace period to restore the state tables and resume normal operations.

It is with these and other issues in mind that various aspects of the present disclosure were developed.

SUMMARY

Implementations of the present disclosure involve a system and/or method for gracelessly rebooting a storage appliance. The method and system includes a storage appliance in association with an event that will result in the loss of a state table from volatile memory that halts changes to at least one state table of the storage appliance. The state tables describe a plurality of file system states of one or more clients connected to the first storage appliance. The state information is written to a persistent memory of the storage appliance. The state table may then be repopulated using the state table information stored in persistent memory.

DETAILED DESCRIPTION

Implementations of the present disclosure involve an apparatus and/or method for repopulating a server state table, and in one particular implementation, for repopulating storage appliance state stables. In this case of storage appliances, the state table maintains a log of the states of various interactions between clients and the storage appliance. Specifically, the present disclosure provides for reducing or eliminating the grace period after a planned or otherwise orderly server reboot (e.g., when a reboot command is issued by a system administrator), failover, takeover, or failback. Before shutting down, the server saves the current state tables to a persistent memory. During normal operation, the state tables are maintained in relatively fast volatile memory, but that memory loses its contents during a reboot. In the specific case of storage appliances, the state information may be stored in a persistent memory of the appliance experiencing an event. Once the server has restarted, the server may populate its state tables using the saved information and begin operation without having to request information from the clients connected with the server. Additionally, a second server may takeover client operations for the first server and use the state information received from the first server to takeover serving the clients of the first appliance. In the paired example, the second server may access the persistent state table information in the first server's persistent storage, and the second server may also take over client interaction related to the first server's storage. These various implementations and others discussed herein allow for the reduction or elimination of the conventional grace period for such events and therefore reduce a client's downtime interacting with servers and appliances during planed events such as when rebooting such systems.

Figure 2A:
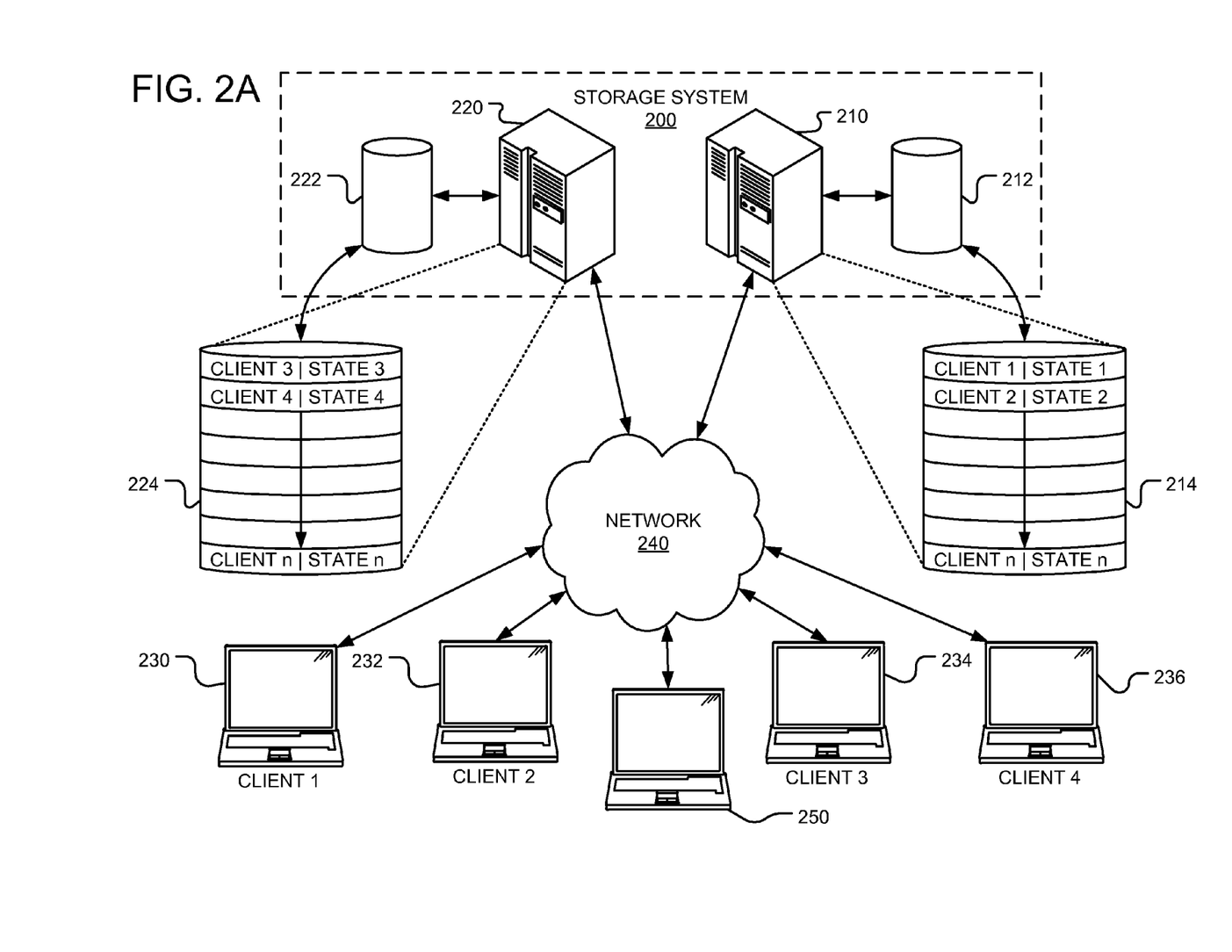
FIG. 2A is a block diagram illustrating an example of a data storage system that is accessible via a network by one or more clients which may be used in implementing embodiments of the present disclosure.

Referring to FIG. 2A an example of a network storage system 200 is depicted. In this example, a pair of storage appliances 210, 220 are configured to direct data to and from the persistent memories 212, 222. In the event of a takeover, reboot, or the like, one server takes over operation for the other server until the server returns to normal operation. The storage appliances 210, 220 may be configured to operate according to the NFSv4 protocol. Each storage appliance 210, 220 may be connected to the network 240 using any type of network connection and each storage appliance 210, 220 may have its own Internet protocol (IP) address. The IP address provides each storage appliance 210, 220 with a location that may be used by clients to connect and communicate with the storage appliance 210, 220. One or more clients 230, 232, 234, 236 may have a need for data that is stored on one of the persistent memories 212, 222 attached to one of the storage appliances 210, 220. The clients 230-236 may connect to the storage appliance using the network 240 and the storage appliance's IP address to request the data. The storage appliance 210, 220 may then facilitate the transfer of the data from the corresponding persistent memories 212, 222 to the requesting client. This may include one of the storage appliances 210, 220 taking temporary ownership of the other storage appliance's persistent memory 212, 222 and providing input/output functionality until the other appliance can resume its duties. For example, in the case where the storage appliance 210, 220 is an Oracle® ZFS™ storage appliance, the metadata may include location information such as which zpool and virtual device the data is located on, as well as any other information regarding the location of the data.

Persistent memory 212, 222 is in communication with the storage appliances 210, 220. In the storage system illustrated in FIG. 2A, the persistent memory 212, 222 may include any persistent type of memory such as a conventional spinning disk hard drive, a solid state hard drive or a magnetic tape drive with magnetic tapes. As used herein, the term "persistent memory" refers to a device whose contents are persevered despite a loss of power.

In various embodiments, each storage appliance 210, 220 may each maintain a state table 214, 224 containing a list of the clients 230-236 connected to the storage appliance 210, 220 and the status of the interactions between the clients and the storage system 200. This status may be characterized as a "state." The state may include any information related to the current operations associated with some interaction between the clients 230-236 and the storage system 200.

Figure 2B:
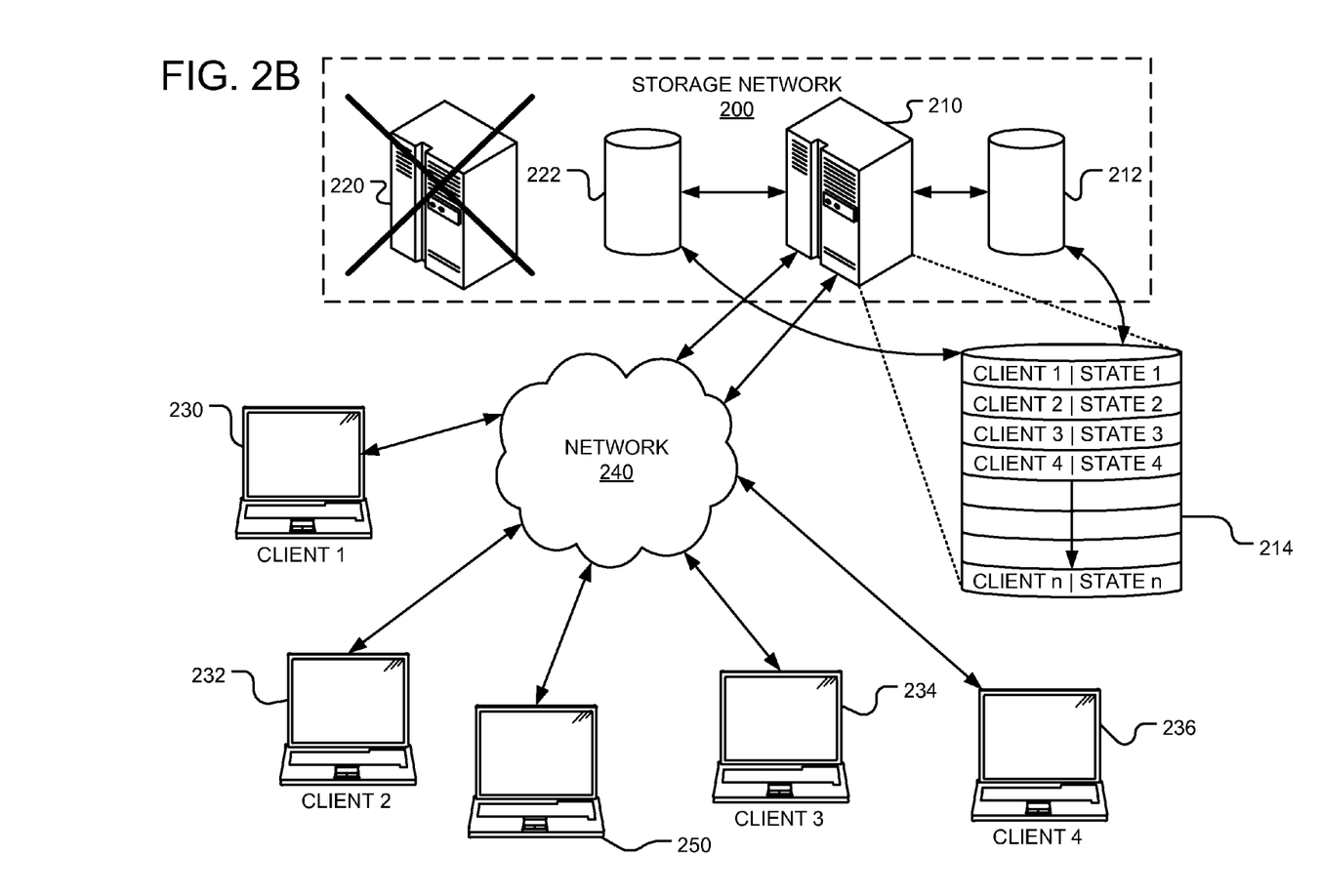
FIG. 2B is a block diagram illustrating an example of a data storage system after a takeover or failover event and may be used in implementing embodiments of the present disclosure.

At any given time, a failover or takeover event may be initiated. During a failover/takeover, one of the appliances may need to be taken offline and the services provided by that appliance may be transferred to another appliance. The clients 230-236 operate normally during and after the takeover/failover without any knowledge that takeover/failover is occurring or has occurred. As shown in FIG. 2A, during a reboot of storage appliance 220, the state table 224 is transferred to persistent memory 222. Referring to FIG. 2B, an example of a storage system after the occurrence of a takeover or failover is illustrated. In this example, the storage appliance 220 is being rebooted and its client operations are taken over by the storage appliance 210. As a result of the event, the storage appliance 210 absorbs the IP address previously associated with storage appliance 220 so that the client network requests originally meant for storage appliance 220 are seamlessly directed to storage appliance 210. In addition, storage appliance 210 also takes over the persistent memory 222 which was originally controlled by the storage appliance 220. As introduced above, the rebooting storage appliance, in this case storage appliance 220, copies information from the state table 224 to persistent memory 222 before shutting down. Then once the persistent memory 222 has been taken over by the remaining storage appliance 210, the storage appliance may use the stored state table 224 information to populate the state table 214 with the states of the clients 234, 236 that were connected to failing storage appliance 220. The result is that clients 234, 236 are able to continue communications with the storage system 200 using the same address, still have access to the same information, and the current state of each client 234, 236 is transferred to the remaining appliance 210. This results in substantially seamless service for the clients even in the event of a reboot of one of the storage appliances.

Once the storage appliance being rebooted or otherwise comes back online, the services taken over by storage appliance 210 along with the persistent memory 222 and storage appliance 220's IP address may be transferred back to storage appliance 220. First, the current states of the clients that were transferred may again be stored in the persistent memory 222. The IP address and persistent memory 222 may be transferred back to the storage appliance 220 and the state table 224 may be repopulated using the stored state table information. Again, the operations of the clients 234, 236 are directed to the storage appliance 220. The clients 234, 236 have now been transferred to the other storage appliance 210 and back to the original storage appliance 220 without major disruptions to the clients' 234, 236 operations.

Since the clients 230-236 use the storage system 200 to store data and retrieve the stored data, there are several states associated with writing and reading data. For example, the client 230 may send a request to the storage system 200 to write data to a file. The state table 214 is then updated to indicate that the client 230 is in the process of writing data to a file. Once the write has been completed, the state table 214 may be updated according to the client's actions. For example, if the user is still accessing the file, the state table 214 may be updated from "write" to "locked" to ensure that no other client may modify the file while the client still has the file open. Once the client no longer needs the file, the "locked" state may be removed from the file. If the client is done accessing any data on the storage system 200, the client may be removed from the state table 214. Otherwise, the state table 214 may be updated according to the actions of the client.

Figure 3A:
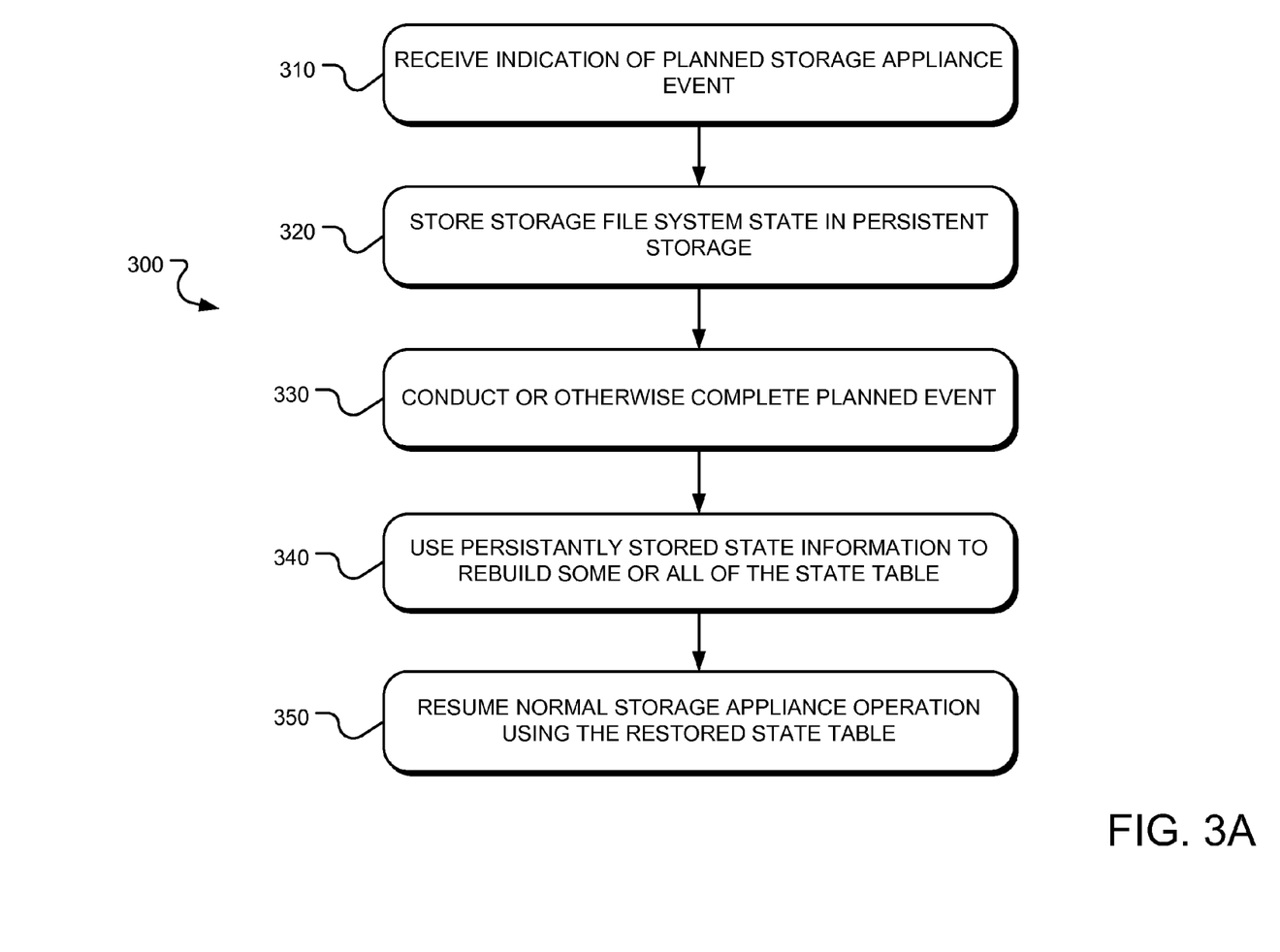
FIG. 3A is a block diagram illustrating an example of a method for planned graceless reboot.
Figure 3B:
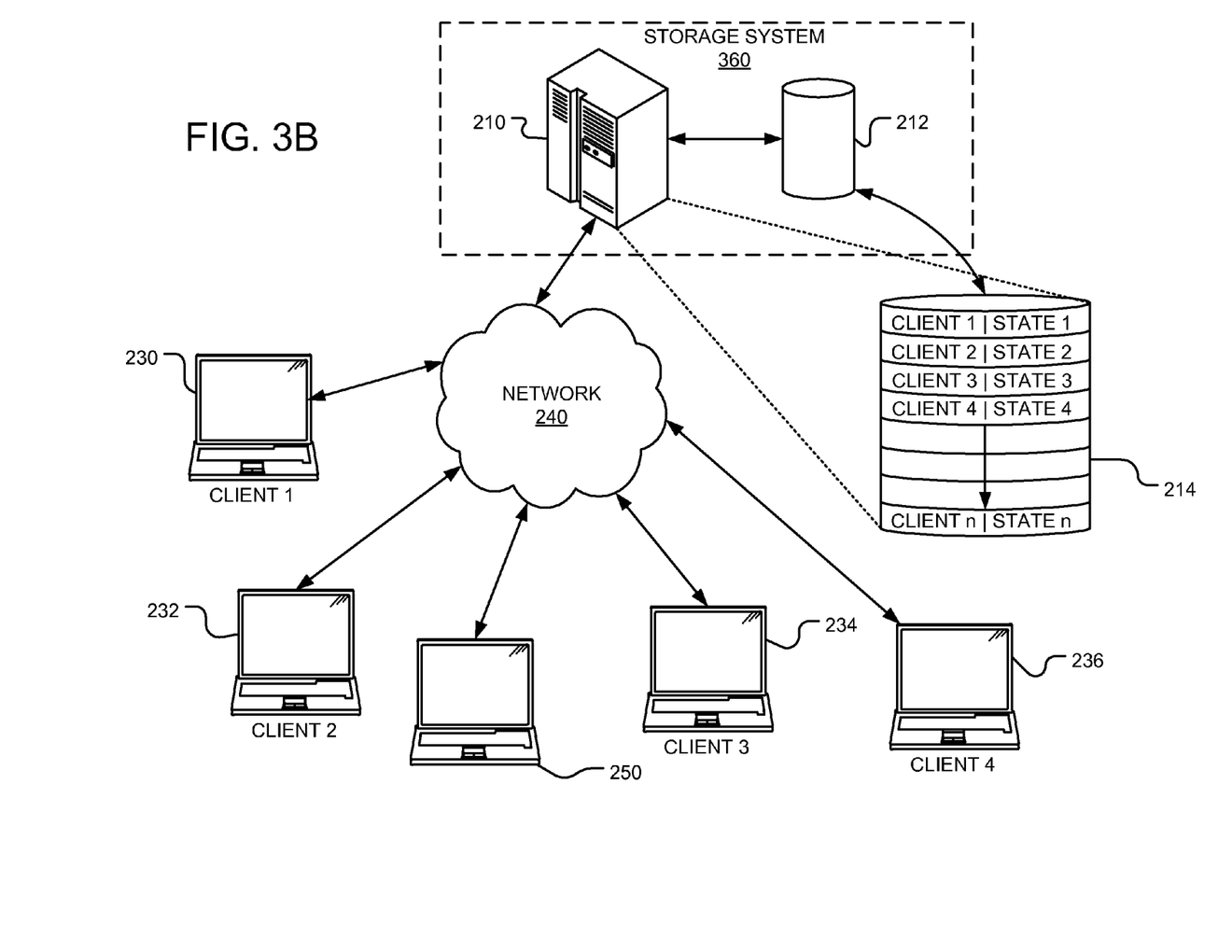
FIG. 3B is a block diagram illustrating an example of a single node storage system which may be used in implementing embodiments of the present disclosure.

Referring now to FIGS. 3A and 3B, a method 300 of restoring a single storage appliance storage system 360 to a specific instance is depicted. In this example, the storage system 360 only includes the storage appliance 210 and is proceeding through a planned, scheduled, or otherwise not unplanned, restart, reboot, or action that will result in the loss of state information (operation 310). In one specific example, an administrator initiates a reboot on a per file system basis by way of a command line interface or graphical user interface at a device 250 in communication with the storage system 360. A system reboot may be initiated for a number of reasons; for example, a system reboot may be initiated to perform system maintenance, or to perform software or hardware upgrades.

In conjunction with the reboot command, the harvest function may be performed. The harvest function halts any modification to the state tables 214. Once the harvest function has been initiated, the state tables 214 may not accept any new requests and waits for any in-progress requests to complete. Once all of the in-progress requests have been completed, any information required for reproducing the state table 214 may be written to persistent memory 212 on the storage appliance 210, or on any server or hard drive connected to the storage appliance 210 (operation 320).

Once all of the entries in the state tables 214 have been halted, state information corresponding to the state table 214 may then be stored in persistent memory 212. Specifically, each state table 214 may be stored in the distributed stable storage (DSS) path associated with the states on the persistent storage 212. In other words, each entry in the state table 214 is associated with one or more files been accessed by a client. The DSS paths are locations where the storage server 210 stores data for identifying each client 230-236. In most cases, there is one DSS path mapped to each zpool. For each DSS path, there is generally a corresponding separate file system in each pool where the client identifiers recorded. The DSS path itself may be analyzed to determine where the path is stored. The harvested state table information is then stored in the zpool that the state table describes. In other words, the state table information may be stored within the DSS path that corresponds to the zpool where the file system resides. Once the harvest has completed by writing all of the state table information to persistent storage 212, the storage appliance 210 may conduct or otherwise complete the planned event, in this case a shutdown and reboot (operation 330). This same mechanism may be used in the clustered node example of FIGS. 2A and 2B.

The state table information may include any information required for reconstructing the state table 214. For example, the state table 214 may include required state data and non-required state data. The required state data may correspond to state data that is required by the particular protocol running on the storage appliance 210. For example, if a client has a current state of "FileLock," the NFSv4 protocol may require the ID of the file being locked, an offset, and a length in order to maintain enough information to be able to rebuild the corresponding state table entry. When the client later attempts to perform another function, such as a "FileUnlock" and provides the file ID, offset and length, the storage appliance is able to verify that the "FileUnlock" corresponds to the "FileLock" and is able to perform the unlock without the client having any knowledge that the state table 214 was rebuilt. The non-required data may correspond to various information used by the storage appliance 210, 220 to keep track of the data being passed within the storage appliance or other requirement besides those required by the file protocol. For example, information stored within the state table such as reference counts, mutual exclusion locks, condition variables and pointers to other data structures are not required for rebuilding the client's state table entry because these values are transient values that will be repopulated and are not necessary for a client to interact with the appliance.

Upon reboot, the hydrate function may then use the persistently stored state information to restore the state table 214 (operation 340). The storage system 200 may perform a hydrate to restore the state table 214 that was harvested, at any time after a harvest has been completed. The determination of when a harvest has been completed may be made with the aid of a scoreboard function.

In various embodiments, a scoreboard may be used track the initiation and completion of a harvest by storing a marker file in persistent memory. For example, when the harvest is started, a marker indicating that a harvest was initiated may be deposited at each location where the harvested state table information is being stored. Upon the completion of the harvest, the marker indicating that the harvest was initiated may be replaced with a marker indicating that the harvest was successful. For example, if the storage system 200 is configured to store the harvested state table 214 information according to the DSS path, then the marker may also be placed according to the DSS path. Additionally, the scoreboard may be configured to maintain a timestamp of a start time within each file system directory that contains the harvested state table information for that file system. Once it has been determined that a hydrate may take place the scoreboard may replace each marker indicating that the harvest was complete with a marker indicating that the hydrate has started.

The hydrate function may be initiated as the system is booting up after a planned system reboot. The hydrate may also be performed on the system taking over the operations of a system that is in failover/takeover, or on the rebooting storage appliance during the performance of a failback, both of which are described below. Once the hydrate function is initiated, the hydrate function may start by reviewing the markers and timestamps left by the scoreboard. For example, the hydrate function may parse through the DSS paths searching for harvested state table information and the markers left by the scoreboard. If the hydrate is able to confirm that the harvest was completed and that each timestamp is identical, then the hydrate may continue. An identical or otherwise matching timestamp indicates that the states being recovered are not old, mismatched, or otherwise outdated. Conversely, if at least on of the markers are missing or if one of the markers only indicates that the harvest started but not completed the hydrate is aborted. The hydrate function may also be configured to compare the timestamps of each harvested state table. If the timestamps are not identical, then the hydrate may be aborted so that an old server instances or multiple server instances are not hydrated. The hydrate function then parses through the harvested state table information and uses the state table information to repopulate the state table 214 with the harvested states. Once the hydrate function has completed, the marker indicating that the hydrate started may be replaced with a marker indicating that the hydrate was completed.

After the successful completion of the hydrate function (as indicated by the markers left by the scoreboard) and the restoration of the state tables 214, the storage appliance 210 may disable the grace period. The harvested state table information may then be deleted from persistent storage 214. If for any reason the hydration fails, as indicated by one or more missing hydrate markers, the grace period is not disabled, and the system defaults to restoration of some or all state information from the clients. Once the state tables 214 have been repopulated based on persistently stored local state information, the storage appliance may restore network connections with the various clients 230-236 and resume normal operations (operation 350).

A similar method may be utilized in the event of a takeover or a failover and a subsequent failback. Referring now to back to the system depicted in FIGS. 2A, 2B and also referring to FIG. 4 a method of graceless reboot for the dual node storage appliance storage system 200 is depicted. In this example, one of the storage appliances 210, 220 may need to be shutdown or rebooted. In the dual storage appliance system 200, the operations of the storage appliance that is being rebooted or otherwise possibly failing (in this case storage appliance 220) may be taken over by the other storage appliance (in this case storage appliance 210). An indication of an event may be sent to one or both of the storage appliances 210, 220 (operation 410). Once the indication of the event has been received, the takeover and harvest functions may be initiated (operation 420). The harvest function performs in a similar manner as described above with respect to a single storage appliance system except the harvest is performed during a takeover/failover in conjunction with a second mode that will remain active.

Figure 4:
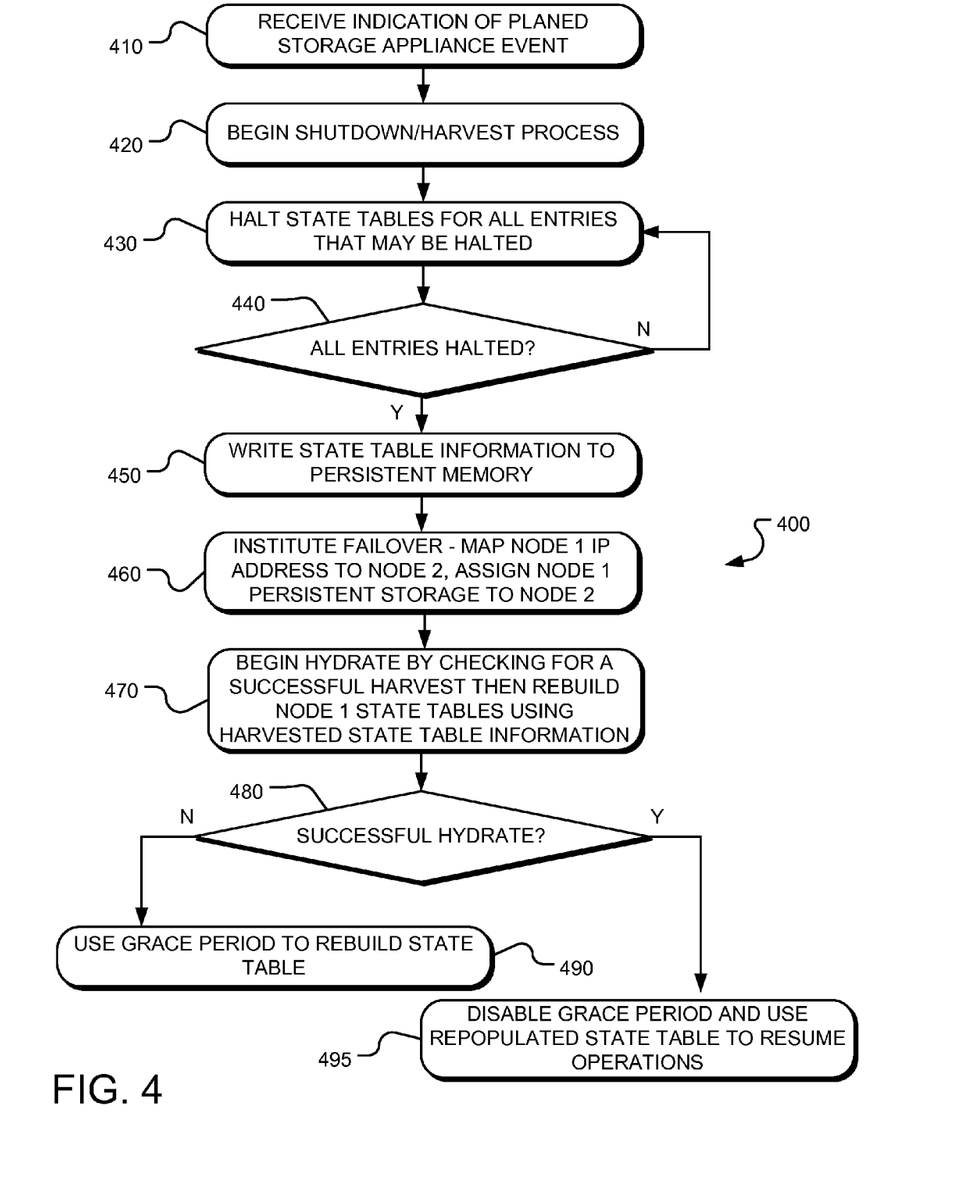
FIG. 4 is block diagram illustrating an example of an alternative method for planned graceless reboot.

The harvest function proceeds to halt modifications to the state table 224 for all states that aren't in the middle of a process (operation 430). If at least one of the state table entries cannot be halted because they are in-process, the harvest function waits until the process have been completed and then halts them preventing future modification (operation 440). Once all of the state tables 224 have been halted, the harvest function may write the state tables 224 to persistent memory 222 (operation 450). The storage appliance 220 may complete the takeover/failover process by assigning the IP address and persistent memory 222 of storage appliance 220 to storage appliance 210 and may proceed with the shutdown or reboot (operation 460). Once the persistent storage and IP address has been assigned to the storage appliance 210 the hydrate process may begin. The hydrate process may search the newly acquired persistent storage 222 for the harvested state table 224 information and ensure that they are complete by finding the markers left by the scoreboard function. The hydrate may also compare the time stamps of multiple state tables to ensure that the time stamps are from a single instance of the storage appliance 220 is being hydrated. The hydrate then adds the states that were present on the state table 224 to the state table 214 using the harvested information. If the hydrate is not successful (operation 480), the grace period is left activated (operation 490) for the clients 234, 236 so that the states for those clients 234, 236 can be repopulated in the state table 214. If the hydrate is successful (operation 480), the grace period is deactivated (operation 495). The harvested state tables may then be deleted from the persistent storage and the storage appliance 210 may operate normally.

After a takeover/failover, the storage appliance 220 may be brought back online is rebooted, the graceless reboot process may again be performed in order to populate the state table 224. The failback process follows the same process as with a failover with one major difference. When harvesting the state table, only the states associated with the persistent storage 222 are harvested and not the complete state table 214. The storage appliance 220 is essentially returned to the state it was in when the takeover/failover occurred with any updates to the state table 224 that occurred while the storage appliance 210 was the only appliance operating. A failback may be initiated automatically or by a command issued by an administrator.

Although the harvest and hydrate functions are shown to operate before the shutdown and after the reboot of the storage appliance 210, 220, these functions may take place asynchronous to the operation of the storage appliance 210, 220. For example, the harvest function may be performed asynchronously to the shutdown of the storage appliance 210, 220 and the hydrate function may be performed asynchronously during the reboot of the storage appliance 210, 220. Stated differently, the harvest and hydrate functions may be performed as the system is shutting down and booting up. Thus, little to no extra time is taken to perform the functions.

A harvest is not limited to just failovers, takeovers, failbacks, and reboots, and may take place at any time. For example, a change in the state table 214 may trigger harvest. Thus, every time a client finishes an operation or starts a new operation, a harvest may be initiated. In some cases, the entire state table 214 may be harvested, while in other cases only the changes to the state table since the last harvest are copied to persistent memory 212, 222 in order to reduce the copying of redundant data and to reduce the time required for harvest. In another example, every state modifying operation may be mirrored to another storage server using a high speed interconnect.

In some cases, the harvest and hydrate functions may be configured to compress/decompress the information stored in the state table 214. In many cases, every piece of the state table 214 is not needed to recreate the entire state table. In these cases, the harvest function may harvest information that is required for rebuilding the state table 214 and the hydrate function may be configured to rebuild the state table 214 using this required information.

Figure 5:
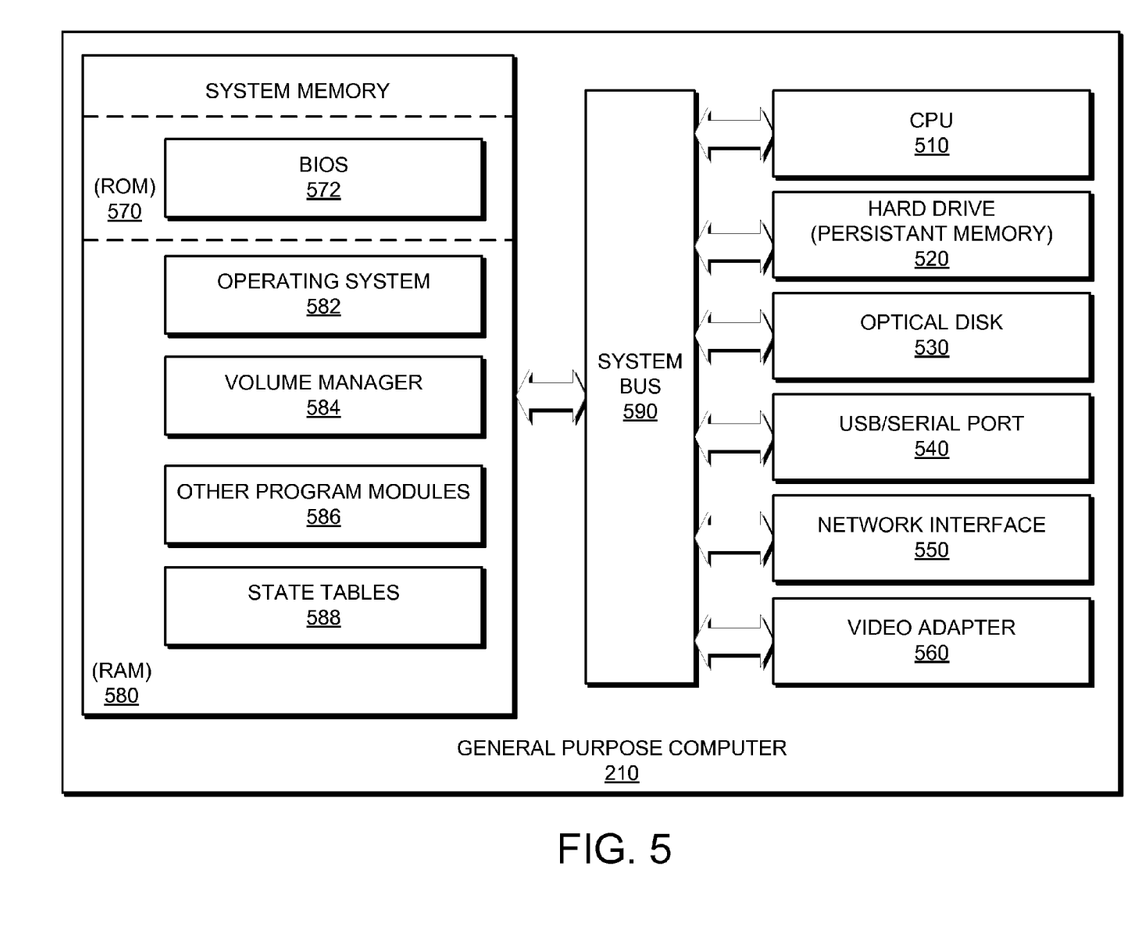
FIG. 5 is block diagram illustrating an example of a storage server or other general purpose computer which may be used in implementing embodiments of the present disclosure.

FIG. 5 illustrates an example of a storage appliance 210, 220 that may be useful in implementing the described technology. The example hardware and operating environment of FIG. 5 for implementing the described technology includes a computing device, such as general purpose computing device in the form of a personal computer, server, or other type of computing device. In the implementation of FIG. 5, for example, the storage server 210 includes a processor 510, a system memory 570, 580, and a system bus 590 that operatively couples various system components including the system memory 570, 580 to the processor 510. There may be only one or there may be more than one processor 510, such that the processor of storage appliance 210, 220 comprises a single central processing unit (CPU), or a plurality of processing units, commonly referred to as a parallel processing environment. The storage appliance 210, 220 may be a conventional computer, a distributed computer, or any other type of computer; the invention is not so limited.

The system bus 590 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 570 and random access memory (RAM) 580. A basic input/output system (BIOS) 572, containing the basic routines that help to transfer information between elements within the storage appliance 210, 220, such as during start-up, is stored in ROM 570. The storage appliance 210, 220 further includes a hard disk drive 520 for reading from and writing to a persistent memory such as a hard disk, not shown and an optical disk drive 530 for reading from or writing to a removable optical disk such as a CD ROM, DVD, or other optical media.

The hard disk drive 520 and optical disk drive 530 are connected to the system bus 590. The drives and their associated computer-readable media provide nonvolatile storage of computer-readable instructions, data structures, program engines and other data for the storage server 210. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, ROM 570, or RAM 580, including an operating system 582, a NFS client 584, one or more application programs 586, and program data such as state tables 588. A user may enter commands and information into the storage appliance 210, 220 through input devices such as a keyboard and pointing device connected to the USB or Serial Port 540. These and other input devices are often connected to the processor 510 through the USB or serial port interface 540 that is coupled to the system bus 590, but may be connected by other interfaces, such as a parallel port. A monitor or other type of display device may also be connected to the system bus 590 via an interface, such as a video adapter 560. In addition to the monitor, computers typically include other peripheral output devices (not shown), such as speakers and printers.

The storage appliances 210, 220 may operate in a networked environment using logical connections to one or more remote computers. These logical connections are achieved by a network interface 550 coupled to or a part of the storage appliance 210, 220; the invention is not limited to a particular type of communications device. The remote computer may be another computer, a server, a router, a network PC, a client, a peer device, a network storage appliance such as a ZFS storage appliance, or other common network node, and typically includes many or all of the elements described above relative to the storage appliances 210, 220. The logical connections include a local-area network (LAN) a wide-area network (WAN), or any other network. Such networking environments are commonplace in office networks, enterprise-wide computer networks, intranets and the Internet, which are all types of networks.

The network adapter 550, which may be internal or external, is connected to the system bus 550. In a networked environment, programs depicted relative to the storage appliance 210, 220, or portions thereof, may be stored in the remote memory storage device. It is appreciated that the network connections shown are example and other means of and communications devices for establishing a communications link between the computers may be used.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A computer-implemented method for restoring an instance of a first storage appliance comprising:
   in association with an event that will result in a state table loss from volatile memory, halting changes to at least one state table of the first storage appliance, the at least one state table describing a plurality of file system states of one or more clients of the first storage appliance;
   writing state table information for the first storage appliance from the at least one state table to a persistent memory of the first storage appliance;
   transferring an Internet Protocol address of the first storage appliance to a second storage appliance;
   transferring control of the persistent memory from the first storage appliance to the second storage appliance;
   populating a second state table on the second storage appliance with the state table information for the first storage appliance, enabling the second storage appliance to take over the one or more clients of the first storage appliance;
   halting changes to one or more entries in the second state table that were previously associated with the first storage appliance and describe a plurality of operating states of the one or more clients in communication with the Internet Protocol address;
   writing information from the one or more entries of the second state table to the persistent memory;
   returning the Internet Protocol address of the first storage appliance to the first storage appliance;
   returning control of the persistent memory to the first storage appliance; and
   repopulating the at least one state table using the state table information and the information from the one or more entries of the second state table stored in the persistent memory.

2. The computer-implemented method of claim 1, wherein the event comprises a reboot command.

3. The computer-implemented method of claim 1, wherein halting changes to the at least one state table of the first storage appliance comprises:
   halting changes to the at least one state table for completed file system states;
   completing at least one in-progress state; and
   halting changes to the at least one state table corresponding to the at least one in-progress state when the in-progress state is completed.

4. The computer-implemented method of claim 1, wherein the state table information comprises information required by a communication protocol for communications between the first storage appliance and the one or more clients.

5. The computer-implemented method of claim 1, further comprising:
   indicating in the persistent memory a successful write of the state table information when the state table information written to the persistent memory is complete for repopulating the at least one state table; and
   aborting the repopulation of the at least one state table when the successful write of the state table information is missing.

6. A computer-implemented method for eliminating a grace period in a first storage appliance comprising:
   starting a planned event that will result in a loss of state table information in volatile memory;
   storing the state table information in a persistent memory, wherein the state information comprises information for recreating a state table;
   transferring an Internet Protocol address from the first storage appliance to a second storage appliance;
   transferring control of the persistent memory from the first storage appliance to the second storage appliance;
   recreating the state table on the second storage appliance using the state information in the persistent memory, enabling the second storage appliance to take over states of the first storage appliance;
   returning the Internet Protocol address back to the first storage appliance;
   returning control of the persistent memory back to the first storage appliance;
   disabling a storage appliance grace period that would otherwise allow the state table to be rebuilt from a plurality of clients of the first storage appliance; and
   rebuilding the state table on the first storage appliance using the state information in the persistent memory.

7. The computer-implemented method of claim 6, wherein the planned event comprises a reboot.

8. The computer-implemented method of claim 6, wherein storing the state table information in the persistent memory comprises halting the modification of the state table.

9. The computer-implemented method of claim 8, wherein halting the modification of the state table comprises:
   evaluating whether a state in the state table may be halted; and
   at least one of halting the state in the state table or waiting until the state may be halted and then halting the state in the state table.

10. The computer-implemented method of claim 6, wherein the state table information comprises information required by a communication protocol for communications between the first storage appliance and at least one of the plurality of clients.

11. The computer-implemented method of claim 6, further comprising:
    indicating in the persistent memory a successful write of the state table information when the state table information written to the persistent is complete for repopulating the state table; and
    aborting the repopulation of the state table when the successful write of the state table information is missing.

12. A system for eliminating a grace period comprising:
    a first storage appliance comprising:
       a first processor;
       a first network interface with a first Internet Protocol (IP) address that allows for one or more clients to connect to the first storage appliance using a network;
       a first volatile memory configured for storing a first state table comprising a state for each of the one or more clients connected to the first storage appliance; and
       a first persistent memory configured to store data; and
    a second storage appliance configured as a cluster capable of splitting operations of the one or more clients, the second storage appliance comprising:
       a second processor,
       a second network interface with a second Internet Protocol (IP) address that allows for the one or more clients to connect to the second storage appliance using the network;

a second volatile memory configured for storing a second state table comprising a state for each of the one or more clients connected to the second storage appliance; and a second persistent memory configured to store data, wherein the first volatile memory stores instructions for operation on the first processor, in association with an event that will result in the loss of the first state table, the first processor configured to:

store first state table information for the first state table in the first persistent memory;

transfer the first IP address from the first storage appliance to the second storage appliance;

transfer control of the first persistent memory from the first storage appliance to the second storage appliance;

rebuild the first state table on the second persistent memory using the state table information from the first persistent memory;

halt changes to one or more entries in the second state table that were previously a part of the first state table;

write information from the one or more entries in the second state table to the first state table information in the first persistent memory;

return the first IP address to the first storage appliance;

return control of the first persistent memory to the first storage appliance; and rebuild the first state table on the first storage appliance with the first state table information; and disable a storage appliance grace period.

13. The system for eliminating a grace period of claim 12, wherein the event comprises a planned reboot of a first storage server for the first storage appliance.

14. The system for eliminating a grace period in a storage appliance of claim 12, further comprising a state scoreboard:

indicating in the first persistent memory a successful write of the first state table information when the first state table information written to the first persistent memory is complete for repopulating the first state table; and aborting the repopulation of the first state table when the successful write of the first state table information is missing.

* * * * *